United States Patent [19]

Lazet et al.

[11] 4,118,463
[45] Oct. 3, 1978

[54] PREPARATION OF HIGHLY ALKALINE SILICATES

[75] Inventors: Frank J. Lazet, Media, Pa.; D. John Meador, Utica; Richard G. Webster, Peiu, both of Ill.

[73] Assignee: PQ Corporation, Valley Forge, Pa.

[21] Appl. No.: 804,485

[22] Filed: Jun. 7, 1977

[51] Int. Cl.² .......................................... C01B 33/32
[52] U.S. Cl. ........................................ 423/334; 65/17
[58] Field of Search ................. 423/334; 65/335, 22, 65/30 R, 134, 17; 106/74

[56] References Cited

U.S. PATENT DOCUMENTS

| | | | |
|---|---|---|---|
| 2,950,570 | 8/1960 | Cowles et al. | 423/334 |
| 3,030,736 | 4/1962 | Penberthy | 65/134 |
| 3,558,297 | 1/1971 | Carney et al. | 65/134 |
| 3,960,532 | 6/1976 | Lazet | 423/334 X |

*Primary Examiner*—Edward J. Meros
*Attorney, Agent, or Firm*—Ernest G. Posner; Fred C. Philpitt; J. S. Stephen Bobb

[57] ABSTRACT

Alkaline silicates such as sodium metasilicate are prepared by a method that prevents unreacted batch ingredients to come in contact with furnace walls. The method also prevents any molten material from contacting the floor of the furnace. The raw materials and unreacted melt are confined to the central portion of the furnace by maintaining vigorous bubbling around the periphery of the melting furnace. The vigorous bubbling action prevents migration of unreacted raw material to the furnace walls. The bubbling eminates from means that extend up from the furnace floor and therefore, the portion of the material in the lower part of the furnace bed is in the solid state.

9 Claims, No Drawings

PREPARATION OF HIGHLY ALKALINE SILICATES

BACKGROUND OF THE INVENTION

This invention relates to the production of alkali metal silicate. In particular, the invention is an improved method for preparing highly alkaline silicate such as sodium metasilicate wherein the unreacted raw materials are confined to the central portion of the furnace by bubbles eminating from bubblers placed around the periphery of the furnace.

Soluble silicates that have mole ratios of about 1 $M_2O:1$ $SiO_2$ can be prepared by subjecting the proper mixture of sand and alkali metal source, generally the carbonate, to temperatures of 2000° F. or higher, thereby producing the molten silicate. The major problems encountered in the production of materials such as sodium metasilicate relate to the corrosive nature of the alkali metal source and its tendency to attack the refractories used to construct the furnace. These attacks not only damages furnace structures, but are also responsible for the major portion of the impurities found in the product.

One solution to the problems encountered in preparing highly alkaline silicate is found in U.S. Pat. No. 2,950,570 to Cowels and Shaver. This patent teaches a method of forming alkaline silicate upon a bed of previously formed, solid alkali silicates in a furnace with walls constructed of water cooled metal chambers. The raw materials are charged to such a furnace and melted using burners. The material forms a quiescent pool of molten alkaline silicate. This molten material solidifies against the water cooled metal chambers so that the corrosive molten alkali metal source does not contact the walls. This system requires large volumes of cooling water, but is also unsuitable as it requires excessive amounts of energy. The cooled surfaces act as heat sinks so that substantial amounts of heat are removed from the system and cannot be utilized in the fusion process. The operation is also energy intensive because the reacting materials must be maintained in the quiescent pool for an extended period of time to achieve homogeneous character. Motion in this pool is restricted to thermally induced currents which are sluggish and therefore, inefficient in mixing the batch. In addition, the hardware required to implement this system is complicated and expensive. The metal chambers forming the furnace walls must have the capacity to respond to changes in the volume of molten material in the furnace. The transverse position of the metal cooling chambers is adjustable which is a further complication of this hardware.

It is an object of this invention to prepare highly alkaline soluble silicates that do not contain impurities from contact of the molten alkali source with the refractory walls. It is also an object to provide alkaline silicate with low impurity levels without the need for cooling water or adjustable metal chambers. It is a further object of this invention to produce homogeneous products in a short fusion time in an agitated pool of molten material.

SUMMARY OF THE INVENTION

We have found the highly alkaline soluble silicates such as sodium metasilicate can be produced without undue contamination from the refractory furnace walls by containing the reacting raw materials in the central portion of the furnace bed. The unmelted, melting and reacting raw materials are confined to the desired area by streams of gas bubbles eminating from a series of bubblers positioned around the periphery of the furnace. The action of the bubbles on the glass bed prevents the unmelted and unreacted raw materials from reaching the walls and attacking them. The bubblers are installed so that the bubbles enter the glass bed at a significant distance above the furnace floor. Heat transfer between that portion of the glass bed above the bubblers and that portion that is not bubbled, is very poor so that the material located below the bubblers is frozen. In this way, the fusion is carried out on a bed of alkaline silicate and the molten materials do not contact the refractories of the furnace floor. Surprisingly, the heat transfer between these two portions of the furnace bed is so limited that very little heat is lost through this liquid-solid interface and the efficiency of our process is improved through this means.

The bubbles of this invention provide several other advantages which lead to more efficient energy utilization. The bubble streams provide efficient mixing action so that the fusion bed is not quiescant and the reaction goes to completion more readily. The bubbling action also provides areas of the furnace bed which are not covered with the white, reflective unmelted raw materials. The areas absorb heat much more readily so that heat transfer to the batch is improved. Surprisingly, the use of bubbling reduces the amount of raw materials that are entrained in the exhaust gases and therefore, particulate air pollution is reduced.

THE INVENTION

The highly alkaline soluble silicates formed using the process of this invention include those with mole ratios of $SiO_2/M_2O$ of 1.5 to 0.75 wherein M stands for an alkali metal. The most common material prepared by the process of this invention is anhydrous sodium metasilicate. According to present practice, silicates can be prepared by charging the various raw materials, usually sand and soda ash, to an open hearth type furnace of regenerative or recuperative design, fired with natural gas or fuel oil. The raw materials, commonly known as a batch, are charged to the furnace, wherein they float on a bed of molten material until upon melting they become part of the molten pool. The unmelted raw materials drift around the furnace in various patterns depending on the furnace configuration. As a matter of course, the floating batch comes in contact with the furnace walls and a concentration of such batch materials can often result. The unreacted or partially reacted alkali metal source is the most corrosive component of the molten, reacting mixture. The completely reacted silicate is not so corrosive and can be allowed to have contact with good quality refractories.

We have found that the unreacted alkali metal source can be confined to the central portion through proper design of the furnace. The furnace to be used is equipped with a series of bubbling means whereby gas bubbles can be introduced into the bed of the furnace. These bubbling means which generally comprise stainless steel pipes or tubes are arranged around the periphery of the furnace. The very vigorous stream of bubbles assends through the molten silicate material. The disturbance of the surface of the molten material prevents the migration of the unmelted, unreacted raw materials past the position of the bubbling means. In this way, batch materials that are charged within the perimeter of the bubbling means do not come in contact with the furnace walls.

The bubbling means are installed so that they protrude from the furnace floor into the furnace bed area for a signifcant portion of the vertical furnace cavity. By utilizing this construction, the stream of gas bubbles enter the molten silicate bed at some distance from the furnace floor. Accordingly, the heat transfer between the material above the bubbles and that below is reduced and the silicate below the bubblers is in the solid state. Since the solid silicate is formed on the furnace floor, it can be seen that the actual reaction of the raw materials is carried out in the central area of the furnace supported on a bed of solid silicate. The reaction is thereby confined and the corrosive alkali metal source cannot contact and attack the furnace wall refractories.

Numerous gases can be used to induce the streams of bubbles required for the process of this invention. Air, nitrogen and stream, among others, appear to be effective in producing the desired effect. Air and steam are preferred in economic reasons. Steam is most preferred as it reacts somewhat with the molten silicate to provide a product that dissolves somewhat faster and more completely.

The size of the bubbles and rate of bubbling are important to our process. The bubbles should between 8 and 18 inches in diameter and the rate of bubble formation should be 3 to 18 bubbles per second. Bubbles of this size and formed at this rate are necessary to: (1) provide a barrier that the floating batch will not cross; (2) provide mixing of the molten silicate and the unreacted raw materials; and (3) prevent loss of heat and melting of the solid silicate found on the floor of the furnace. If the bubbling is as vigorous as described, the melting and reaction will take place near the surface of the molten silicate bed and the heat transfer between the molten material and the solid material below the bubbling means will be very limited. If the bubbling is not as vigorous as described, the reaction and melting is more spread out and the material below the bubbles can melt. In addition, with the use of less vigorous bubbling, the unreacted raw materials may not be contained in the desired portion of the furnace bed.

There are various bubbling means by which bubbles can be introduced into a liquid or molten material. We prefer to mount tubes of stainless steel or other heat resistant materials in refractory blocks so that they protrude a significant distance into the furnace bed. The tubes should extend from the furnace floor for a distance of 25 to 80% of the furnace bed depth. For example, if the molten silicate line is 20 inches from the furnace floor, the bubbler tubes should extend to between 5 and 16 inches from the furnace floor to provide the solid silicate foundation for the bed.

The positions of the bubbling means are important in confining the raw materials to the central portion of the furnace bed. The bubbles must completely enclose the central portion of the bed and should be positioned 1.5 to 3 feet from the furnace walls. The centers of the bubblers should be separated by no more than 1.5 to 2.5 feet. In general, if the bubblers are located further from the furnace walls, they can be separated somewhat more, but not more than 2.5 feet.

Since the raw materials are confined to the central part of the furnace, they must be introduced to that portion of the furnace bed. This is accomplished by extending an insulated chute through the crown of the furnace near the center of the bed. The raw material are fed through the chute to the surface of the molten silicates. The batch is automatically delivered at the rate determined by melting of the batch and the rate at which the molten silicate is drawn.

The process of our invention is carried out as follows. Silicate of the same composition to be prepared is placed in the furnace to cover the furnace floor. The level of this material extends to within about 2 inches of the bubbling means. Sand can also be used to cover the furnace floor in starting this process, but it will gradually be displaced by the silicate as it dissolves in the molten silicate. After the furnace floor has been covered, the burners are fired and the bubblers are activated. As the furnace heats up, the raw materials are introduced through the centrally located chute. The temperature is maintained at about 2000° F. or higher. The raw materials melt and react to form the molten silicate bed. The vigorous bubbling can be seen to confine the raw materials to the central portion of the furnace. After equilibrium in the melt is established, the molten silicate is drawn from the furnace and solidified in any convenient manner.

The product realized is an alkaline silicate such as sodium metasilicate. These silicates contain only minimal impurities which are generally present in the raw materials.

A surprising result of employing the process of our invention is a reduction of the particulate air pollultion eminating from the furnace. In prior art glass furnaces that are heated using oil or natural gas, the combustion gases attain sufficient velocity to entrain some of the particulate raw materials. These particles are carried out of the furnace with exhaust gases and must be removed to comply with particulate emission standards. We have found that furnaces operated using the gas bubbling techniques described herein do not exhaust large amounts of particulate matter and the exhaust gases do not generally require treatment to comply with emission standards.

EXAMPLES

The following Examples are illustrative of several embodiments of the process of this invention and are not meant to establish the scope of our invention. The scope of the invention is fully set forth in the specification and the claims. All proportions are in parts by weight (pbw) or in percent by weight (%) unless otherwise indicated.

EXAMPLE 1

A furnace with a width of 11 feet 2 inches and a length of 15 feet 7 inches and a bed depth of 20 inches was equipped with 18 bubblers consisting of stainless steel tubes mounted in refractory blocks. The bubbler installations extended 8 inches from the furnace floor and were positioned on 2 foot centers, 2 feet from the furnace walls forming an area of about 80 sq. feet enclosed by a perimeter of bubblers. About 6 inches of sodium metasilicate was placed on the floor of the furnace bed. Then the furnace was fired and the bubblers were activated using about 30 psig of steam.

As the temperature in the furnace rose, the raw materials were charged. The proportions were of 1 mole of essentially pure silica sand per 1 mole of $Na_2CO_3$ in the form of soda ash. Charging continued as a molten bed of sodium metasilicate was formed. The bubbling was very vigorous and it was observed that more than 10 bubbles per second were breaking the surface of the molten material. The unreacted material floated on the molten silicate bed and was confined.

No unreacted material was observed between the bubblers and the furnace wall. In addition, mixing of the raw materials with the molten material was observed near the bubbler locations.

The areas immediately surrounding the bubblers and the area between the bubblers and the furnace wall were free of reflective unreacted raw materials and these areas could then absorb more heat. The crown temperature was about 2150° F. and the raw materials could be charged at fast rates indicating that melting and reacting were taking place rapidly. After 48 hours of charging, the furnace was tapped and the product was drawn from the furnace at about the same rate that raw material was charged.

The molten silicate drawn from the furnace was clear of any unreacted material and appeared completly uniform. The product when cooled and granulated, was perfectly white sodium metasilicate. The mole ratio was 0.97 $SiO_2$/1.00 $Na_2O$. The impurity and insoluble levels were less than 0.19% and 0.02%, respectively. The metasilicate was producted at 3500 lbs./hour and required 4500 BTU/lb. of silicate.

Silicate was produced in this furnace continuously for 3 months. After shut down, no appreciable wear on the furnace walls was observed.

EXAMPLE 2

The process of Example 1 was repeated except that the bubblers were not activated. During this run, batch piles and ridges could be seen drifting throughout the entire area of the furnace. In several instances concentrations of unreacted material were observed next to the furnace walls. The crown temperature was 2275° F.

After 48 hours of operation, the furnace was tapped and the silicate drawn from the furnace. Some white masses were seen in the draw. Samples were recovered and analyzed and found to be largely unreacted sand. The mole ratio of the product was 0.95 $SiO_2$/1.00 $Na_2O$. The impurity and insoluble levels were 0.22% and 0.5%, respectively. The metasilicate was produced at 1870 lbs./hour and required 5700 BTU/lb. of glass.

After 2 weeks of production, errosion of the furnace walls was observed.

We claim:

1. A process for producing highly alkaline alkali metal silicate having 0.75 to 1.5 moles of $SiO_2$ per mole of $M_2O$ wherein M stands for sodium or potassium said process comprising the steps of:
    (a) forming a bed of said alkali metal silicate within the bed area of an open hearth furnace, said bed being equipped with bubbling means positioned around the periphery of the bed area extending a distance above the floor of said furnace, sufficient amounts of said alkali metal silicate being used so that the level of the silicate is within 2 inches of the level of the bubbling means;
    (b) raising the temperature within the furnace to 2000° F. or higher;
    (c) supplying a gas under pressure to said bubbling means thereby activating them;
    (d) charging raw materials in the proper proportion to the central portion of said furnace bed through an insulated chute, said raw materials consisting of a source of silica and a source of alkali metal;
    (e) maintaining the temperature within the furnace at 2000° F. or higher thereby melting the raw materials and forming a molten pool upon the silicate bed with gas bubbles eminating from said activated bubbling means breaking the surface;
    (f) continuing to charge the said raw materials to the central part of the furnace through said insulated chute, said raw materials floating on said pool of molten silicate until they melt and react, said unmelted raw materials being confined to the central portion of the furnace bed by said gas bubbles breaking the surface of the molten silicate; and
    (g) drawing the molten silicate from the furnace to recover the product.

2. The process of claim 1 wherein the source of silica is sand and the alkali metal source is sodium carbonate or potassium carbonate.

3. The process of claim 1 wherein the bubbling means are stainless steel tubes mounted in refractory blocks, said tubes extending 25 to 80% of the bed depth above the furnace floor and positioned 1.5 to 3 feet from the furnace walls on 1.5 to 2.5 foot centers.

4. The process of claim 1 wherein the gas used to activate the bubbling means and form bubbles is selected from the group consisting of nitrogen, air and steam.

5. The process of claim 4 wherein the gas is steam.

6. The process of claim 1 wherein the bubbles break the surface of the molten silicate at a rate of 3 to 18 bubbles per second and have diameters between 8 and 18 inches.

7. The process of claim 1 wherein the product is sodium metasilicate.

8. A process for producing highly alkaline alkali metal silicates having 0.75 to 1.5 moles of $SiO_2$ per mole of $M_2O$, wherein M stands for sodium or potassium, said process comprising the steps of:
    (a) forming a bed of said alkali metal silicate within the bed area of an open hearth furnace, said bed being equipped with bubbling means positioned around the periphery of the furnace on 1.5 to 2.5 foot centers at a distance of 1.5 to 3 feet from the furnace walls and extending 25 to 80% of the furnace bed depth above the furnace floor, sufficient amounts of said alkali metal silicate being used to establish the level of the silicate as within about 2 inches of the level of the bubbling means;
    (b) raising the temperature within the furnace to 2000° F. or higher;
    (c) supplying a gas under pressure to said bubbling means thereby activating them, said gas being selected from the group consisting of nitrogen, air and steam;
    (d) charging raw materials in the proper proportion to the central portion of said furnace bed through an insulated chute, said raw materials consisting of sand and sodium carbonate or potassium carbonate;
    (e) maintaining the temperature within the furnace at 2000° F. or higher, thereby melting the raw materials and forming a molten pool of silicate upon the silicate bed added previously with 3 to 18 bubbles per second breaking the surface of the pool, said gas bubbles being 8 to 18 inches in diameter and eminating from the bubbling means;
    (f) continuing to charge said raw materials to the central part of the furnace through said insulated chute, said raw materials floating on said pool of molten silicate until they melt and react, said unmelted raw materials being confined to the central portion of the furnace bed by the gas bubble breaking the surface of the molten silicate; and
    (g) drawing the molten silicate from the surface to recover the product.

9. The process of claim 8 wherein the gas used to activate the bubblers is steam.

* * * * *